(12) United States Patent
Yamada et al.

(10) Patent No.: US 11,566,590 B1
(45) Date of Patent: Jan. 31, 2023

(54) CAPILLARY ACTION WATER EVAPORATOR FOR CHARGE-AIR COOLER

(71) Applicant: FORD GLOBAL TECHNOLOGIES, LLC, Dearborn, MI (US)

(72) Inventors: Shuya Shark Yamada, Novi, MI (US); Shawn Spannbauer, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/538,531

(22) Filed: Nov. 30, 2021

(51) Int. Cl.
*F02M 31/20* (2006.01)
*F28F 17/00* (2006.01)
*F02M 33/00* (2006.01)

(52) U.S. Cl.
CPC ............ *F02M 31/20* (2013.01); *F02M 33/00* (2013.01); *F28F 17/005* (2013.01)

(58) Field of Classification Search
CPC ........ F02M 33/00; F02M 31/20; F28F 17/005
See application file for complete search history.

(56) References Cited

FOREIGN PATENT DOCUMENTS

JP        2009092005 A  *  4/2009  ............ F02M 26/06

* cited by examiner

*Primary Examiner* — Kevin A Lathers
(74) *Attorney, Agent, or Firm* — Vincent Mastrogiacomo; Brooks Kushman P.C.

(57) ABSTRACT

A charge-air cooler includes an airflow path, a heat exchanger in fluid communication with the airflow path, a water reservoir, and a water-wicking plate. The water-wicking plate has a lower portion disposed in the water reservoir and an upper portion disposed in the airflow path, wherein the water-wicking plate includes a water-absorbent material configured to draw water from the water reservoir and to release the water to the airflow path.

20 Claims, 4 Drawing Sheets

US 11,566,590 B1

CAPILLARY ACTION WATER EVAPORATOR FOR CHARGE-AIR COOLER

TECHNICAL FIELD

This disclosure relates to charge-air coolers designed to reduce water induction into an engine.

BACKGROUND

Turbocharged and supercharged engines may be configured to compress ambient air entering the engine in order to increase power. Because compression of the air may cause an increase in temperature of the air, a charge-air cooler (sometimes called an intercooler) may be utilized to cool the heated air thereby increasing its density and further increasing the potential power of the engine.

SUMMARY

According to one embodiment, a charge-air cooler includes an airflow path, a heat exchanger in fluid communication with the airflow path, a water reservoir, and a water-wicking plate. The water-wicking plate has a lower portion disposed in the water reservoir and an upper portion disposed in the airflow path, wherein the water-wicking plate includes a water-absorbent material configured to draw water from the water reservoir and to release the water to the airflow path.

According to another embodiment, a charge-air cooler includes a heat exchanger, an inlet plenum attached to an inlet side of the heat exchanger, and an outlet plenum attached to an outlet side of the heat exchanger. The inlet plenum, the outlet plenum, and the heat exchanger cooperate to define an airflow path extending from the inlet plenum to the outlet plenum. A water-wicking plate is vertically arranged within one of the inlet plenum and the outlet plenum. The water-wicking plate includes a water-absorbent material configured to draw water upwardly from a water reservoir to the airflow path.

According to yet another embodiment, a charge-air cooler includes a heat exchanger, an inlet plenum attached to an inlet side of the heat exchanger, and an outlet plenum attached to an outlet side of the heat exchanger. The inlet plenum, the outlet plenum, and the heat exchanger define an airflow path and a water reservoir. A first water-wicking plate is supported within the inlet plenum with a lower portion disposed in the water reservoir and an upper portion disposed in the airflow path. A second water-wicking plate is supported within the outlet plenum with a lower portion disposed in the water reservoir and an upper portion disposed in the airflow path.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

If the humidity of the ambient air is high, the air is cold, and/or the engine is equipped with exhaust gas recirculation (EGR), condensation (e.g., water droplets) may form on any internal surface of the charge-air cooler that is cooler than the dew point of the air. This condensed water may be collected in a water reservoir, e.g., a bottom portion of the charge-air cooler. This water, either liquid or vapor, may be drawn into the engine combustion chambers resulting in engine misfire, loss of torque and engine speed, hydro-lock, or incompletely burned fuel, for example. As we described in detail below, disclosed is a charge-air cooler having one or more water evaporators configured to slowly release the collected water, as vapor, into the engine at concentrations that do not substantially reduce engine performance.

Figure 1:
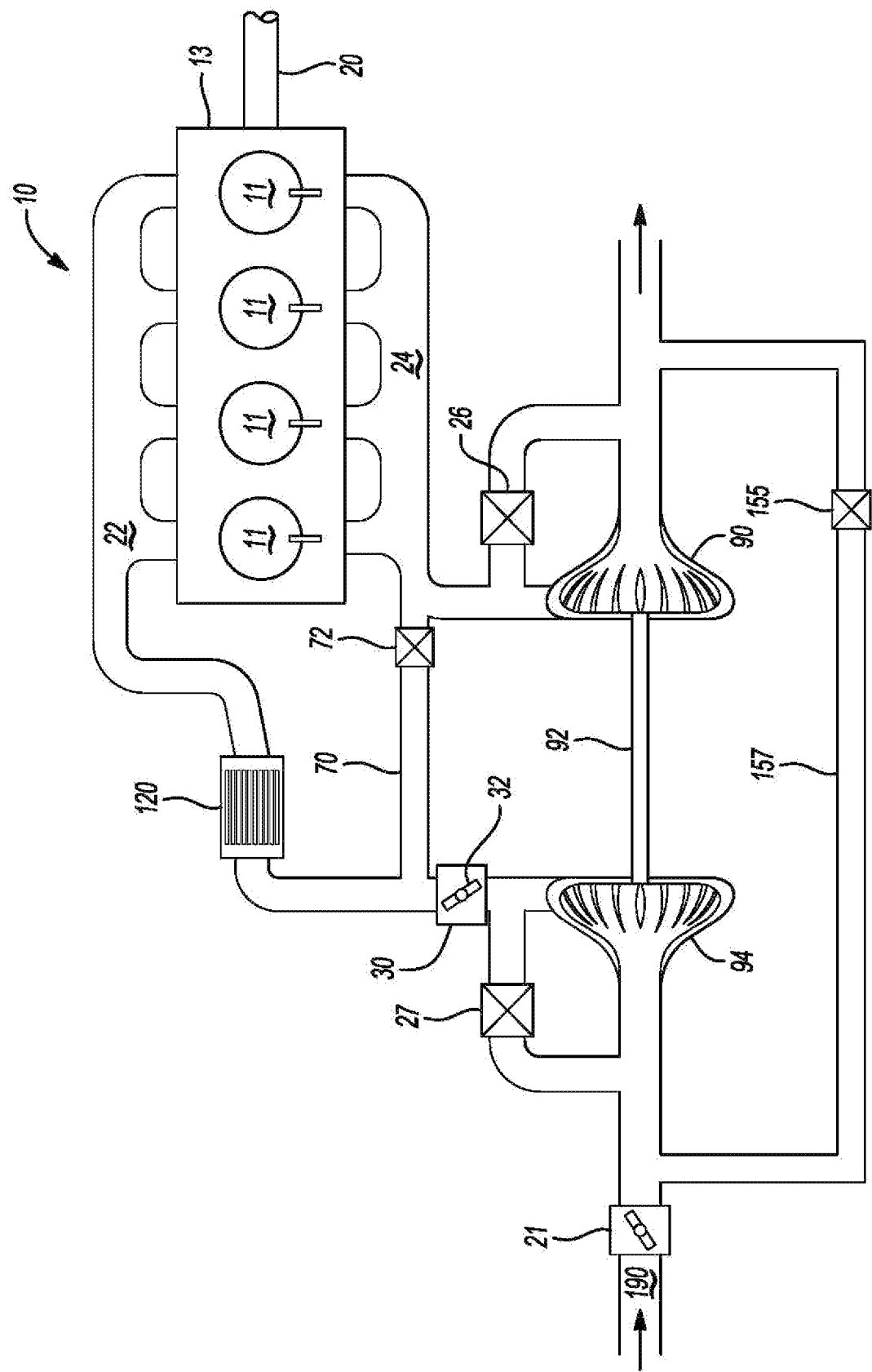
FIG. 1 is a diagrammatical view of an engine system.

Referring to FIG. 1, an engine system 10 may be a diesel engine, a gasoline engine, or other type of engine that utilizes various components in accordance with the present disclosure. The system 10 includes an internal-combustion engine 13 having a block defining a plurality of cylinders 11. The engine 10 is controlled by an engine controller sometimes referred to as an ECU or PCM. The engine 10 includes pistons (not shown) positioned within the cylinders 11 and connected to a crankshaft 20. The cylinders 11 communicate with an intake manifold 22 and an exhaust manifold 24 via respective intake and exhaust valves. The intake manifold 22 may be integrated within a cylinder head (not shown) or may be a stand-alone component. Additionally or alternatively, the exhaust manifold 24 may be integrated within the cylinder head or may be a stand-alone component.

The intake manifold 22 communicates with a throttle body 30 via a throttle plate 32. While the throttle body 30 is depicted as being downstream of a compressor 94, it will be appreciated that the throttle body 30 may be placed upstream of the compressor 94 in other designs. Alternatively, or additionally, the throttle body 30 may be placed in the air induction tube upstream of the compressor.

The engine system 10 may include an exhaust gas recirculation (EGR) system to help lower NOx and other emissions. For example, the engine 10 may include a high-pressure EGR system in which exhaust gas is delivered to the intake manifold 22 by a high-pressure EGR passage 70 communicating with the exhaust manifold 24 at a location upstream of a turbine 90 of a compression device, e.g., a turbocharger, and communicating with the intake manifold 22 at a location downstream of the compressor 94. A high-pressure EGR valve assembly 72 may be located in a high-pressure EGR passage 70. Exhaust gas may then travel from the exhaust manifold 24 first through the high-pressure EGR passage 70, and then to the intake manifold 22. The amount of EGR provided to the intake passage 190, upstream of throttle body 30 and downstream of a charge-air cooler 120, may be varied by the controller via an EGR valve, such as the high-pressure EGR valve 72. An EGR cooler (not shown) may be included in high-pressure EGR tube 70 to cool re-circulated exhaust gases before entering the intake manifold. Cooling may be done using engine coolant or by an air-to-exhaust gas heat exchanger.

FIG. 1 also shows a low-pressure EGR system where EGR is routed from downstream of the turbine 90 to upstream of the compressor 94 through a low-pressure EGR passage 157. A low-pressure EGR valve 155 may control the amount of EGR provided to the intake passage 190. In some embodiments, the engine may include both a high-pressure EGR and a low-pressure EGR system, as shown in FIG. 1. In other embodiments, the engine may include either a low-pressure EGR system, a high-pressure EGR system, or none. When operable, the EGR system may increase the formation of condensate as it increases the water vapor concentration in the charge air, particularly when the charge air is cooled by a charge-air cooler.

A compression device may be a turbocharger (as shown), a supercharger, or the like. The depicted compression device may have a turbine 90 coupled with the exhaust manifold 24 and a compressor 94 coupled with the intake manifold 22 via a charger-air cooler (intercooler) 120, which may be an air-to-air heat exchanger, but could also be liquid cooled. The turbine 90 is typically coupled to the compressor 94 via a drive shaft 92. The speed of the turbine 90 may be controlled by a wastegate 26. A sequential turbocharger arrangement, single VGT, twin VGTs, or any other arrangement of turbochargers could be used and could include coolers within the compression device system, such as between two stages of compression.

The intake passage 190 may include an air-intake control valve 21. Additionally, the intake passage 190 may include a compressor bypass or recirculation valve (CRV) 27 configured to divert intake air around the compressor 94. The wastegate 26 and/or the CRV 27 may be controlled by the controller to be opened when a lower boost pressure is desired. For example, in response to compressor surge or a potential compressor-surge event, the controller may open the CRV 27 to decrease pressure at the outlet of the compressor 94. Additionally or alternatively, the CRV 27 and/or the wastegate 26 may be opened to decrease a pressure in the charge-air cooler 120 and as a result, reduce condensate formation in the charge-air cooler.

The compressor 94 may be upstream of the charge-air cooler 120 to provide compressed charge air to the charge-air cooler 120. The charge-air cooler 120 may be used to decrease the temperature of the turbocharged or supercharged compressed gas mixture. The charge-air cooler 120 may be an air-to-air cooler or a liquid-to-air cooler.

As explained above, condensate may accumulate in the charge-air cooler 120 and pool at the bottom in a water reservoir. This water may be pulled into the engine, where it can cause combustion instability or hydro-lock if the water induction rate or amount is too high. As will be described in more detail below, the charge-air cooler includes features for managing the water. This allows for automatic draining while also avoiding combustion issues.

Figure 2:
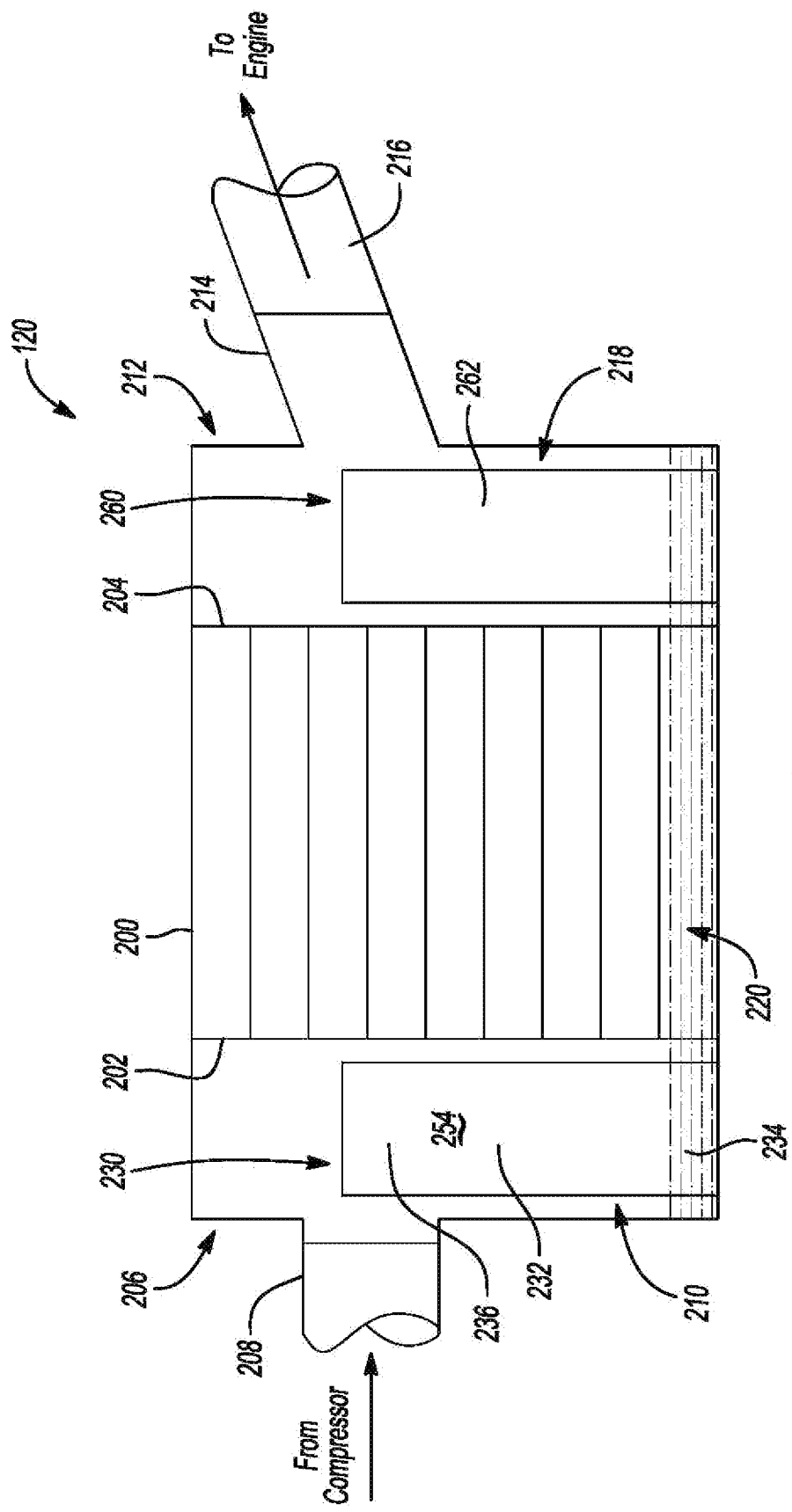
FIG. 2 is a diagrammatical side view of a charge-air cooler having a water-control valve.

Referring to FIG. 2, the charge-air cooler 120 (a type of heat exchanger) includes a heat-exchanger core 200 that may be configured as an air-to-air heat exchanger. The heat exchanger 200 includes a plurality of passages for conveying the charge air through the heat exchanger 200 (e.g., left to right in the drawing). The heat exchanger 200 also includes a plurality of opening allowing outside air to pass therethrough. The heat exchanger 200 may further include fins and similar heat exchanging devices. During operation, the charge air passes through the passages and the outside air passes the openings thereby transferring heat from the charge air to the outside air. In other embodiments, the charge-air cooler 120 may be an air-to-liquid heat exchanger. The heat exchanger 200 includes an inlet side 202 and an outlet side 204. The passages extend from the inlet side 202 to the outlet side 204.

An inlet plenum 206 is attached to the inlet side 202 of the heat exchanger 200. The inlet plenum 206 receives pressurized air, e.g., the charge air, from the compressor. For example, the plenum 206 includes an inlet port 208 that connects to an air duct in fluid communication with the compressor. The plenum 206 is sized and shaped to match the inlet side of the heat exchanger 200 to cover over the passages and seal to the heat exchanger 200. The plenum 206 acts as a manifold to provide the charge air from the compressor to the passages extending through the heat exchanger 200. The plenum 206 and the heat exchanger 200 cooperate to define an air-tight cavity 210 that feeds the passages.

An outlet plenum 212 is attached to the outlet side 204 of the heat exchanger 200. The outlet plenum 212 receives the air exiting the heat exchanger 200 and guides the air to the outlet 214 connected in fluid communication with the intake manifold 22 via one or more air ducts 216. The plenum 212 is sized and shaped to match the outlet side of the heat exchanger 200 to cover over the passages and seal to the heat exchanger 200. The plenum 212 and the heat exchanger 200 cooperate to define an air-tight cavity 218 that receives cooled air from the passages.

A lower portion of the charge-air cooler 120 forms a water reservoir 220. Portions of the water reservoir 220 may be formed by the plenums 206, 212 and the heat exchanger 200. The water reservoir 220 collects condensate formed in the charge-air cooler 120. During operation of the engine, the airflow through the charge-air cooler 120 may carry water with it to the engine. The engine is capable of combusting a certain amount of water without issue, however, excessive amounts of water can reduce engine performance.

To reduce the amount of water entering the engine, the charge-air cooler 120 includes one or more water evaporators configured to absorb and wick liquid water from the water reservoir to reduce, and in some instances, substantially eliminate standing water within the water reservoir 220. This reduces the amount of liquid water entering the engine and, in some instances, may completely prevent liquid water from entering the engine. The one or more water evaporators are configured to store the liquid water therein and release the water as vapor into the charge air that is flowing past the evaporators. In doing so, the water evaporators reduce the likelihood of a slug of water entering the engine. This reduces the likelihood of water affecting engine performance.

Referring to back FIG. 2, the one or more water evaporators may be disposed in one or more of the plenums 206, 212. In the illustrated embodiment, each of the plenums includes a water evaporator. In other embodiments, however, only one of the plenums may include a water evaporator. For example, the water evaporator may only be disposed in the inlet plenum 206 or the outlet plenum 212. Referring back to the illustrated embodiment, the inlet plenum 206 includes a water evaporator 230 configured to absorb and store water from the water reservoir 220. The water evaporator 230 may include one or more water-wicking plates 232 each arranged vertically with a lower portion 234 disposed in the water reservoir 220 and an upper portion 236 disposed in the airflow path of the charge-air cooler. The one or more water-wicking plates 232 are configured to draw water upwardly from the water reservoir 220 via capillary action, store the water as trapped liquid, and release the water as vapor to the charge air through evaporation.

Figure 3:
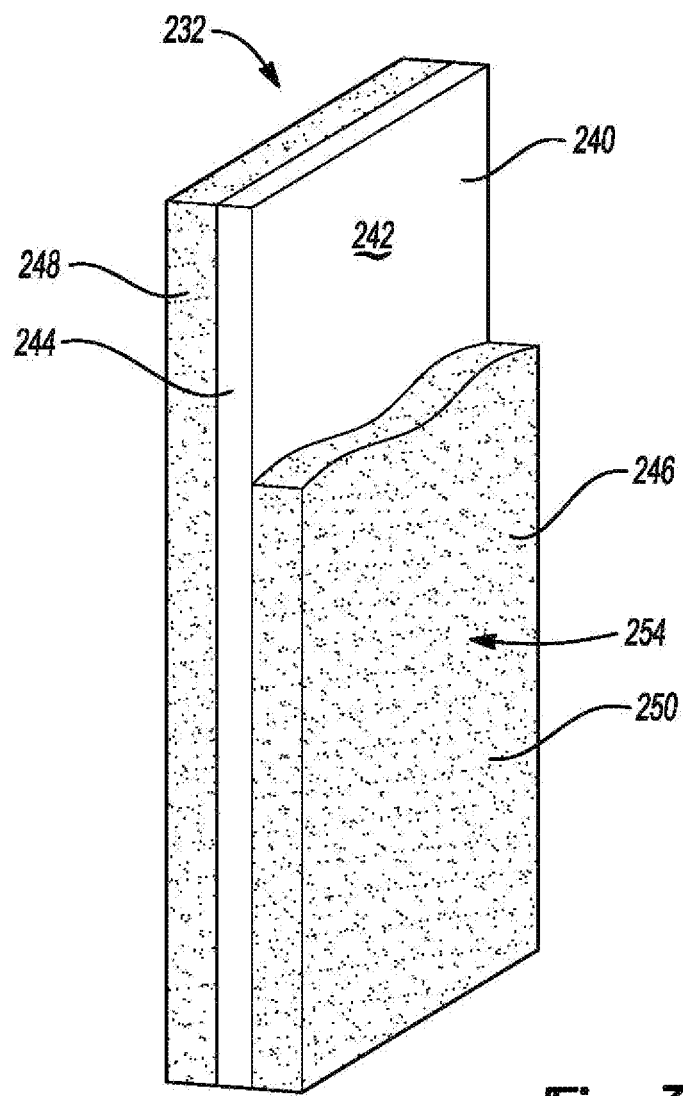
FIG. 3 is a perspective view of a water-wicking plate with a portion of the water-absorbing layer removed for illustrative purposes.

Referring to FIG. 3, an example water-wicking plate 232 may include a substrate 240 having a generally elongated rectangular shape with opposing major sides 242 and minor sides or edges 244. The substrate may be metal, plastic, composite, or other rigid material. One or more of the major sides 242 supports a water-absorbent material. In the illustrated embodiment, the substrate 240 supports water-absorbent material on both major sides 242. For example, a first layer of water-absorbent material 246 is attached on one of the major sides 242 and a second layer of water-absorbent material 248 is attached to the other major side. The water-absorbent layers may be shaped to match the substrate 240 and have exterior planar faces 250 forming the major sides 254 of the water-wicking plates 232.

Figure 4A:
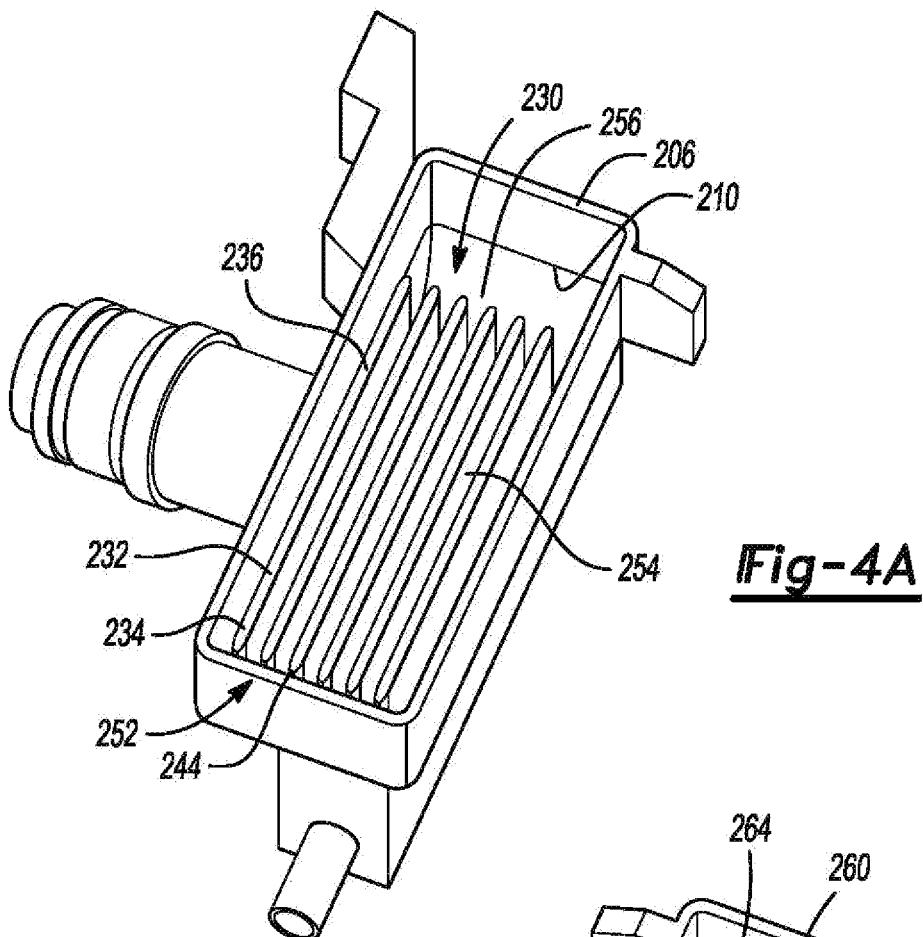
FIG. 4A is a perspective view of an inlet plenum of the charge-air cooler.
Figure 4B:
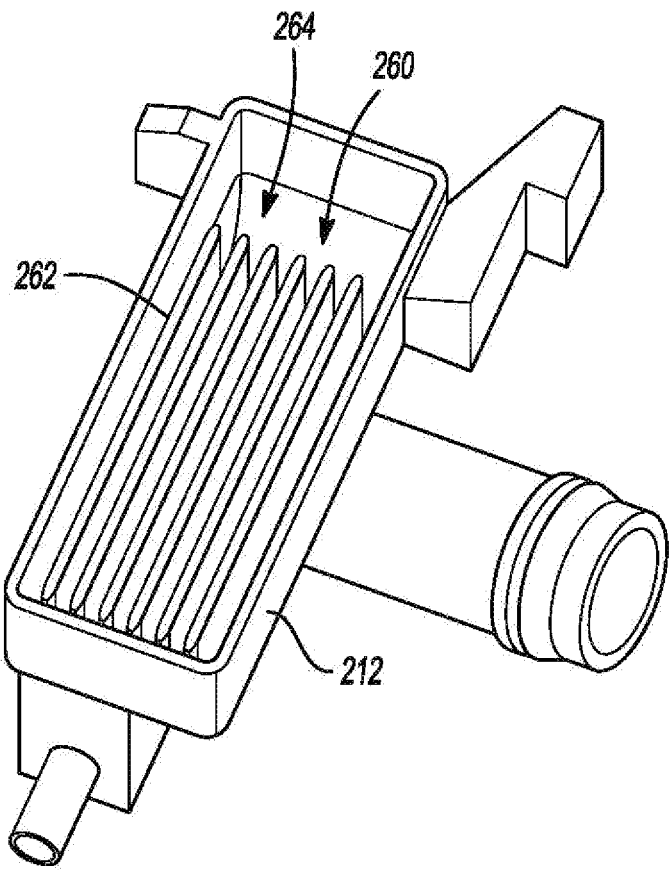
FIG. 4B is a perspective view of an outlet plenum of the charge-air cooler.

Referring to FIGS. 2, 4A, and 4B, the water evaporator 230 may include a plurality of water-wicking plates 232 arranged in a linear stack 252 across a width of the inlet plenum 206 and disposed in the cavity 210. Within the stack 252, the plates 232 are arranged in a same orientation with the major sides 254 substantially parallel to the direction of the airflow path through charge-air cooler 120. Used herein, "substantially parallel" means within plus or minus five degrees of parallel. Thus, the axial direction of the stack 252 is generally transverse to the airflow path. The plates 232 are spaced apart with air gaps 256 defined between the major sides 254 of adjacent plates 232 so that the charge air flows over all of the exterior planar faces 250 of the absorbent layers 246, 248. The plates 232 may be supported by attaching one or more of the minor sides 244 of the plates 232 to one or more interior surfaces of the plenum 206. The plates 232 may be attached by adhesive, mechanical connection, or the like.

In the illustrated embodiment, six plates 232 are shown, however, more or less may be used in other embodiments. The number of water-wicking plates in the stack may vary based on the size of the charge-air cooler, the amount of water expected to be produced, the water-storage capacity of the water-absorbent material, the size of the water-wicking plates, and the water sensitivity of the engine.

Another water evaporator 260 may be disposed within the outlet plenum 212. The water evaporator 260 includes one or more water-wicking plates 262 arranged in a stack 264. The water evaporator 260 may be the same or similar to the water evaporator 230 and for brevity will not be described in detail again.

The number of water-wicking plates 232 in the inlet stack 252 may be the same as the number of water-wicking plates 262 in the outlet stack 264. Alternatively, the water evaporator 260 may have more or less plates and the water evaporator 230. For example, the water evaporator 260 may have more plates than the water evaporator 230, or vice versa.

In the illustrated embodiment, the tops of the water-wicking plates 232, 262 do not extend to the tops of the plenums 206, 212 but rather extend roughly to the inlet port 208 and the outlet port 214. In other embodiments, the water-wicking plates may extend higher such as to the tops of the plenums. Alternatively, the tops of the water-wicking plates 232, 262 may be lower and fully below the inlet 208 and the outlet 214.

During operation of the charge-air cooler 120, the charge air passes through the one or more stacks of water-wicking plates causing the water held by the water-absorbent material to evaporate and enter the airstream. This allows for automatic draining of the charge-air cooler while also managing water release into the engine to reduce the likelihood of performance degradation due to water entering the engine. The use of water-wicking plates also promotes the evaporation of water especially under low-load duty cycles. This creates a more uniform draining of the charge-air cooler compared to designs that do not include the water-wicking plates, which primarily drain during heavy-load duty cycles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A charge-air cooler comprising:
   an airflow path;
   a heat exchanger in fluid communication with the airflow path;
   a water reservoir; and
   a water-wicking plate having a lower portion disposed in the water reservoir and an upper portion disposed in the airflow path, wherein the water-wicking plate includes a water-absorbent material configured to draw water from the water reservoir and to release the water to the airflow path.

2. The charge-air cooler of claim 1, wherein the water-wicking plate further includes a substrate having a first side attached to the water-absorbent material.

3. The charge-air cooler of claim 2, wherein the water-wicking plate further includes a second water-absorbent material attached to a second side of the substrate.

4. The charge-air cooler of claim 1 further comprising a plenum, wherein the water-wicking plate is disposed in the plenum.

5. The charge-air cooler of claim 1, wherein water-wicking plate includes opposing major sides that are arranged substantially parallel to the airflow path.

6. The charge-air cooler of claim 1, wherein the water-wicking plate is a plurality of plates arranged in a stack.

7. The charge-air cooler of claim 6, wherein the stack extends transverse to the airflow path.

8. A charge-air cooler comprising:
a heat exchanger;
an inlet plenum attached to an inlet side of the heat exchanger;
an outlet plenum attached to an outlet side of the heat exchanger, wherein the inlet plenum, the outlet plenum, and the heat exchanger cooperate to define an airflow path extending from the inlet plenum to the outlet plenum; and
a water-wicking plate vertically arranged within one of the inlet plenum and the outlet plenum, the water-wicking plate including a water-absorbent material configured to draw water upwardly from a water reservoir to the airflow path.

9. The charge-air cooler of claim 8, wherein the water-wicking plate is disposed in the outlet plenum.

10. The charge-air cooler of claim 9 further comprising a second water-wicking plate disposed in the inlet plenum.

11. The charge-air cooler of claim 8, wherein the water-wicking plate is a plurality of plates arranged in a stack.

12. The charge-air cooler of claim 8, wherein the water-wicking plate further includes a substrate having a first side attached to the water-absorbent material.

13. The charge-air cooler of claim 12, wherein the water-wicking plate further includes a second water-absorbent material attached to a second side of the substrate.

14. The charge-air cooler of claim 8, wherein water-wicking plate includes opposing major sides that are arranged substantially parallel to the airflow path.

15. A charge-air cooler comprising:
a heat exchanger;
an inlet plenum attached to an inlet side of the heat exchanger;
an outlet plenum attached to an outlet side of the heat exchanger, wherein the inlet plenum, the outlet plenum, and the heat exchanger define an airflow path and a water reservoir;
a first water-wicking plate supported within the inlet plenum with a lower portion disposed in the water reservoir and an upper portion disposed in the airflow path; and
a second water-wicking plate supported within the outlet plenum with a lower portion disposed in the water reservoir and an upper portion disposed in the airflow path.

16. The charge-air cooler of claim 15, wherein each of the first and second plates is arranged parallel to the airflow path.

17. The charge-air cooler of claim 15, wherein each of the first and second plates includes a water-absorbent material.

18. The charge-air cooler of claim 15, wherein the first water-wicking plate is a plurality of water-wicking plates arranged in a stack.

19. The charge-air cooler of claim 18, wherein the second water-wicking plate is a plurality of water-wicking plates arranged in a stack.

20. The charge-air cooler of claim 15, wherein the first water-wicking plate includes a substrate layer and a water-wicking layer.

* * * * *